: 3,053,893
Patented Sept. 11, 1962

3,053,893
RECRYSTALLIZATION OF DEMETHYL-
CHLORTETRACYCLINE
Siegfried Arthur Muller, Closter, N.J., assignor to American Cyanamid Company, New York, N.Y., a corporation of Maine
No Drawing. Filed July 22, 1960, Ser. No. 44,549
4 Claims. (Cl. 260—559)

This invention relates to the purification of demethylchlortetracycline and more particularly is concerned with a novel process of recrystallizing demethylchlortetracycline in an improved manner whereby high yields of high purity products are obtained.

The demethyltetracyclines, demethyltetracycline itself, and demethylchlortetracycline (7-chloro-6-demethyltetracycline) are members of a new family of tetracycline antibiotics which are described and claimed in United States Patent to Jerry Robert Daniel McCormick et al. No. 2,878,289. The demethyltetracyclines therein described are produced by certain mutant strains of *Streptomyces aureofaciens* derived from the chlortetracycline-producing *S. aureofaciens* A–377 soil isolate described in United States Patent to Duggar No. 2,482,055 and deposited at the Northern Regional Research Laboratory, Peoria, Illinois as NRRL 2209. The new demethyltetracycline-producing strains are derived by treatment of A–377 with mutagenic agents. Cultures of the new demethyltetracycline-producing strains of *S. aureofaciens* are on deposit at the American Type Culture Collection, Washington, D.C. under ATCC accession numbers 12551, 12552, 12553 and 12554.

Demethylchlortetracycline, as compared to the well-known broad-spectrum antibiotic tetracycline, singularly achieves far greater antibiotic activity against susceptible organisms with far less drug; it has strikingly greater stability in body fluids; and it has enhanced resistance to degradation and a low rate of renal clearance, all supporting high levels of antibiotic activity for extended periods.

Demethylchlortetracycline, the unique fermentation product of a mutant strain of *Streptomyces aureofaciens*, is almost invariably associated with small amounts of demethyltetracycline and an epimeric form of demethylchlortetracycline, 7-chloro-6-demethyl-4-epi-tetracycline, which are also products of the fermentation. It then becomes necessary to effect a separation of these antibiotics, or at least to recover demethylchlortetracycline in a highly purified form substantially free from demethyltetracycline and the epimeric form of demethylchlortetracycline. While these antibiotics can be effectively separated by paper chromatographic techniques, this is not practical in large scale commercial operations and efforts have been directed towards the development of a commercially practicable process for preparing essentially pure demethylchlortetracycline.

One of the best processes for the purification of chlortetracycline and tetracycline is the process disclosed in the United States Patent to Winterbottom et al. No. 2,671,806. This process involves dissolving crude chlortetracycline, for example, in a hydroxylated organic solvent such as a lower alkanol by the use of a nitrogenous base, e.g. triethylamine, which serves to neutralize and solubilize the chlortetracycline. The undissolved impurities are removed by filtration and by readjusting the pH of the filtrate with hydrochloric acid to the desired level, purified chlortetracycline hydrochloride is precipitated therefrom.

This process, while eminently suitable for the purification of chlortetracycline or tetracycline in that it produces a high quality therapeutically useful product, is not without certain disadvantages, notably in that it involves the use of hydroxylated organic solvents and organic bases which keep the cost of the purification procedure high. Additionally, and of the utmost importance when dealing with demethylchlortetracycline, recrystallization of demethylchlortetracycline from the organic solvents of the Winterbottom et al. patent, e.g. butanol and 2-ethoxyethanol, does not effect a reduction in the amount of demethyltetracycline or the amount of the epimer of demethylchlortetracycline to any appreciable extent. Consequently, when this process is applied to the recrystallization of demethylchlortetracycline the final product has too high a percentage of these other antibiotics to conform to specification standards.

The present invention is concerned with an improved process of recrystallizing demethylchlortetracycline which involves the formation of a demethylchlortetracycline-urea-sulfate complex from aqueous solutions containing crude demethylchlortetracycline and from which a highly purified form of demethylchlortetracycline hydrochloride or neutral can be regenerated with ease. The final product has a high potency, good color and is substantially free from associated demethyltetracycline and the epimer of demethylchlortetracycline.

The novel complex is formed by contacting crude darkly-colored demethylchlortetracycline with from about 3 to about 20 equivalents of from a 10% to a fully saturated (60% wt./vol.) aqueous urea solution per equivalent of demethylchlortetracycline. Sulfate ion, preferably as sulfuric acid, is then added in excess of one molecular equivalent to adjust the pH to between about 0.5 and 2.5 and preferably about 0.7–0.9 whereupon the demethylchlortetracycline-urea-sulfate complex is precipitated leaving the darkly-colored impurities, demethyltetracycline and 7-chloro-6-demethyl-4-epi-tetracycline in solution. The complex is collected by filtration, washed with alcohol and dried.

The demethylchlortetracycline-urea-sulfate complex has a ratio of 2 moles of urea to 1 mole of acid sulfate per mole of demethylchlortetracycline.

Highly purified demethylchlortetracycline may be regenerated from this complex with ease by slurrying the complex in water and acidifying the solution to a pH of between 0.1 and 1.0 with hydrochloric acid whereupon purified light yellow crystals of the hydrochloride having a high biological potency may be obtained.

Alternatively the demethylchlortetracycline-urea-sulfate complex can be converted to demethylchlortetracycline neutral by slurrying the complex in water and adjusting the pH to between about 3–6 by the use of aqueous base, e.g. ammonium hydroxide, to obtain purified demethylchlortetracycline neutral.

The present invention should not be confused with the process of purifying tetracycline from solutions containing the same by the use of urea. Thus, when that process is applied to demethylchlortetracycline at the specified pH range of 3–5 no crystallization of demethylchlortetracycline takes place at all. Conversely, under the preferred conditions for crystallizing demethyltetracycline-urea-sulfate according to the present invention, pH 0.7–0.9, and with concentrations of urea about the same as used with tetracycline, the tetracycline remains in solution and gives no crystals at all.

The invention will be described in greater detail in conjunction with the following specific examples.

*Example 1*

A 1-gram sample of demethylchlortetracycline base was dissolved in 8 milliliters of a 0.25 N sulfuric acid and the resultant solution divided into two equal parts:

(a) To one part was added 0.5 gram of $(NH_4)_2SO_4$ followed by 1 milliliter of 3.6 N $H_2SO_4$ and then by 0.5 gram of $(NH_4)_2SO_4$. The stirred solution was seeded with demethylchlortetracycline-urea-sulfate but no crystallization took place;

(b) To the other part was added 0.5 gram of $H_2NCONH_2$ followed by 1 milliliter of 3.6 N $H_2SO_4$. After ½ hour, the crystalline product which formed was collected by filtration and washed with 1.5 milliliters of 2B alcohol. The 0.55 gram of dried product which resulted contained 17.5 percent of urea as determined by the urease method, and had a spectrophotometric assay of 750 mcg./mg.

*Example 2*

A 2.4 gram quantity of demethylchlortetracycline hydrochloride was dissolved in 3.6 milliliters of saturated aqueous urea ($H_2NCONH_2$) solution and followed by the addition of 2 milliliters of 18 N sulfuric acid ($H_2SO_4$). After ¾ hour, the crystals which formed were collected by filtration, washed with 2B alcohol, and vacuum dried. The dried demethylchlortetracycline-urea-sulfate complex assayed 730 mcg./mg., microbiologically, and had 17.4% urea and 13.7% sulfate.

*Example 3*

A 4 gram portion of brown crude demethylchlortetracycline hydrochloride, assaying 875 mcg./mg. microbiologically was stirred for 15 minutes in 5 milliliters of saturated aqueous urea. Solution appeared to be essentially complete. A 0.5 milliliter quantity of 36 N sulfuric acid was added dropwise while cooling the urea solution in a water bath. The rapid crystallization of product caused the mixture to set thick. A 2 milliliter portion of saturated aqueous urea was added to mobilize the slurry and was followed by 1 milliliter of 36 N sulfuric acid. The slurry was stirred overnight at pH 0.7. The resulting product was collected by filtration, washed with 6 milliliters of 80 percent ethanol and vacuum-dried. The 4.65 grams of demethylchlortetracycline-urea-sulfate complex thus obtained was slurried in 14 milliliters of water plus 0.2 milliliter of 50% cetyltrimethylammonium chloride. Then 4.5 milliliters of hydrochloric acid was added and the rapidly-crystallizing slurry was stirred for 1 hour. The product was separated out by filtration, washed with 0.4 N hydrochloric acid and with water, and dried in vacuo to give 3.05 grams of light yellow crystals of the hydrochloride having a microbiological assay of 914 mcg./mg.

*Example 4*

To a solution of 500 grams of demethylchlortetracycline-urea-sulfate complex, assaying 702 mcg./mg. spectrophotometrically, in 3 liters of water was added 12 milliliters of 31 percent aqueous cetyltrimethylammonium chloride and enough concentrated ammonium hydroxide to obtain a pH of 3.9 after 2 hours stirring. The product was collected by filtration, washed with 1.2 liters of water, and dried at 50° C. in vacuo to yield 276 grams of demethylchlortetracycline neutral assaying 1046 mcg./mg. spectrophotometrically.

This application is a continuation-in-part of application Serial No. 858,331, filed December 9, 1959, now abandoned.

I claim:

1. The process of recrystallizing demethylchlortetracycline which comprises contacting crude demethylchlortetracycline with from about 3 to about 20 equivalents of aqueous urea, adding sulfate ion thereto in excess of one molecular equivalent to adjust the pH of the solution to a pH of between about 0.5 and 2.5 so as to form a demethylchlortetracycline-urea-sulfate complex, and recovering the complex so formed.

2. The process according to claim 1 in which the demethylchlortetracycline-urea-sulfate complex is contacted with hydrochloric acid at a pH of between 0.1 and 1.0 so as to precipitate purified demethylchlortetracycline hydrochloride.

3. The process according to claim 1 in which the demethylchlortetracycline-urea-sulfate complex is contacted with an inorganic aqueous base at a pH of between about 3–6 so as to precipitate purified demethylchlortetracycline neutral.

4. Demethylchlortetracycline-urea-sulfate complex.

References Cited in the file of this patent

UNITED STATES PATENTS 2,905,662    Smith et al. _____ Sept. 22, 1959